(12) United States Patent
Zhang et al.

(10) Patent No.: US 11,305,854 B2
(45) Date of Patent: Apr. 19, 2022

(54) DEEP-SEA LOW-COST LONG-ENDURANCE COLLABORATIVE NAVIGATION AND POSITIONING SYSTEM

(71) Applicants: National Deep Sea Center, Qingdao (CN); Qingdao National Laboratory for Marine Science and Technology Development Center, Qingdao (CN)

(72) Inventors: Tongwei Zhang, Qingdao (CN); Guangjie Han, Qingdao (CN); Lei Yan, Qingdao (CN); Haibing Li, Qingdao (CN); Xiujun Sun, Qingdao (CN); Shuai Zhang, Qingdao (CN); Jingxiao Liu, Qingdao (CN); Lei Yang, Qingdao (CN)

(73) Assignees: NATIONAL DEEP SEA CENTER, Qingdao (CN); QINGDAO NATIONAL LABORATORY FOR MARINE SCIENCE AND TECHNOLOGY DEVELOPMENT CENTER, Qingdao (CN); TECHNOLOGY DEVELOPMENT CENTER, Qingdao (CN)

(*) Notice: Subject to any disclaimer, the term of this patent is extended or adjusted under 35 U.S.C. 154(b) by 0 days.

(21) Appl. No.: 16/849,482

(22) Filed: Apr. 15, 2020

(65) Prior Publication Data
US 2021/0284305 A1    Sep. 16, 2021

(30) Foreign Application Priority Data

Mar. 12, 2020    (CN) .......................... 202010169386.4

(51) Int. Cl.
*B63G 8/39* (2006.01)
*B63B 49/00* (2006.01)
(Continued)

(52) U.S. Cl.
CPC ................ *B63G 8/39* (2013.01); *B63B 49/00* (2013.01); *B63B 51/00* (2013.01); *B63G 8/001* (2013.01);
(Continued)

(58) Field of Classification Search
CPC . B63G 8/00; B63G 8/001; B63G 8/39; B63G 2008/004; B63G 8/16; B63G 8/22;
(Continued)

(56) References Cited

U.S. PATENT DOCUMENTS

| | | | |
|---|---|---|---|
| 10,345,803 B2 * | 7/2019 | Peeters | G01S 5/02 |
| 10,351,240 B1 * | 7/2019 | Sills | G05D 1/0088 |

(Continued)

FOREIGN PATENT DOCUMENTS

| | | |
|---|---|---|
| CN | 103033186 | 4/2013 |
| CN | 108955678 | 12/2018 |

OTHER PUBLICATIONS

Office Action dated Apr. 28, 2021, in corresponding Chinese Patent Application No. 202010169386.4, with English Translation.
(Continued)

*Primary Examiner* — Lars A Olson
(74) *Attorney, Agent, or Firm* — Wenderoth, Lind & Ponack, L.L.P.

(57) ABSTRACT

A deep-sea low-cost long-endurance collaborative navigation and positioning system. A shore-based monitoring center transmits a route planning solution to a wave glider. The wave glider follows an underwater vehicle to travel and feeds back state information of the wave glider and state information of the underwater vehicle to the shore-based monitoring center in real time. The shore-based monitoring center adjusts the route planning solution according to the state information in real time. The wave glider and the underwater vehicle are respectively equipped with an under-
(Continued)

water acoustic communication machine. The wave glider obtains self location and time information through a satellite and transmits the location and time information to the underwater vehicle in an underwater acoustic communication manner, then the underwater vehicle calculates a horizontal distance between the underwater vehicle and the wave glider to assist a microelectromechanical system (MEMS) sensor of the underwater vehicle in navigation and positioning.

8 Claims, 2 Drawing Sheets

(51) Int. Cl.
    *B63B 51/00*     (2006.01)
    *B63G 8/00*     (2006.01)
    *G01S 13/86*     (2006.01)
    *G01S 19/07*     (2010.01)

(52) U.S. Cl.
    CPC .............. *G01S 13/862* (2013.01); *G01S 19/07* (2013.01); *B63B 2201/18* (2013.01); *B63G 2008/004* (2013.01)

(58) Field of Classification Search
    CPC ....... B63B 49/00; B63B 51/00; G01S 13/862; G01S 19/07
    USPC ......................................................... 114/328
    See application file for complete search history.

(56) References Cited

U.S. PATENT DOCUMENTS

| | | | |
|---|---|---|---|
| 11,021,223 B2* | 6/2021 | Fikes | B63G 8/39 |
| 2020/0042020 A1* | 2/2020 | Zhang | B63G 8/001 |

OTHER PUBLICATIONS

Office Action dated Jul. 6, 2021, in corresponding Chinese Patent Application No. 202010169386.4, with English Translation.
Office Action dated Aug. 25, 2021, in corresponding Chinese Patent Application No. 202010169386.4, with English Translation.
LI Xiao-tao et al., "Principle and System Design of a Wave Glider", Journal of Sichuan Ordnance, vol. 34, No. 12, 2013, pp. 128-131, with English Abstract and Concise Description of Relevance provided on p. 6 of CB and p. 7 of CC.
Scandal Wusheng, et al., "Aerial Robots (Fixed Wings) Special Education Materials", Harbin Engineering University Press, Sep. 2013, pp. 104-107, with Concise Description of Relevance provided on pp. 7-9 of CC.

* cited by examiner

DEEP-SEA LOW-COST LONG-ENDURANCE COLLABORATIVE NAVIGATION AND POSITIONING SYSTEM

TECHNICAL FIELD

The present invention relates to the field of navigation and positioning, and in particular to a deep-sea low-cost long-endurance collaborative navigation and positioning system.

BACKGROUND

Navigation and positioning are general key mated technologies when an underwater vehicle such as a deep-sea long-endurance autonomous underwater vehicle (AUV), a glider and the like explores the deep sea. However, because the seawater has strong attenuation to the electromagnetic wave, the global navigation satellite system (GNSS) cannot be directly applied to the underwater vehicle such that there is unique challenge to underwater navigation and positioning, especially navigation and positioning in the deep sea. In conclusion, the underwater navigation and positioning must select another manner.

In recent years, a ship-underwater vehicle collaborative navigation and positioning system based on "heavy" marine equipment is the widest research and application hotspot at home and abroad. Such collaborative navigation and positioning system navigates and positions the underwater vehicle generally by utilizing a shipborne ultrashort baseline, wherein a surface ship should follow the underwater vehicle to travel, but in this case, it cannot conduct tasks in other sea areas. An underwater acoustic communication manner is selected to transmit positioning data of the ultrashort baseline to the underwater vehicle, in this case, a large delay exists to improve the difficulty of fusing the positioning data with online navigation data of the underwater vehicle. Additionally, separate installation of an acoustic transducer array and an attitude sensor is unavoidable to generate installation errors which must be corrected by the sea calibration test, but each correction needs to select a proper sea area so as to consume a large amount of time, manpower and material resources. With low costs, long endurance and clustering development of the underwater vehicle and strong demands of marine observation on stereo networking and collaborative observation of multiple deep-sea underwater vehicles, the ship-underwater vehicle collaborative navigation and positioning system based on "heavy" marine equipment is more and more difficult to meet actual application requirements.

Just based on the above background, people starts to research an underwater collaborative navigation and positioning system based on "medium" marine equipment. A typical collaborative system comprises an unmanned surface vehicle-underwater vehicle collaborative navigation and positioning system and a master-slave underwater vehicle collaborative navigation and positioning system. The unmanned surface vehicle-underwater vehicle collaborative navigation and positioning system utilizes an unmanned surface vehicle (USV) as an information relay, transmits location information of the USV to the underwater vehicle in an underwater acoustic communication manner and simultaneously measures distance in order to restrict an inertial navigation system of the underwater vehicle by utilizing the distance information. Generally, the underwater vehicle is equipped with a high-precision strapdown inertial navigation system, a Doppler log and the like to commonly form an inertia-based combined navigation system. Similarly, in the master-slave underwater vehicle collaborative navigation and positioning system, a master underwater vehicle may be precisely positioned by utilizing a high-precision navigation device; a slave underwater vehicle utilizes a low-precision low-cost navigation device, so the underwater navigation and positioning should be combined with the distance measurement between the master underwater vehicle and the slave underwater vehicle. Compared with the ship-underwater vehicle collaborative navigation and positioning system based on "heavy" marine equipment, the underwater collaborative navigation and positioning system based on "medium" marine equipment can reduce the use cost to a large extent. However, the USV has the limited endurance (for example, M80B USV produced by yunzhou-tech in Zhuhai has the endurance of 30 hours, and the other models of the USV have the endurance of about 10 hours), which cannot meet a requirement on long endurance. The master underwater vehicle not only needs to be equipped with an expensive navigation and positioning device (which generally needs the support of the surface ship), but also has the limited underwater working time (which is dozens to hundreds of hours). Therefore, the underwater collaborative navigation and positioning system based on "medium" marine equipment still cannot meet the requirements of low-cost long-endurance navigation and positioning.

With the low cost, long endurance and clustering development of a deep-sea underwater vehicle and the strong demands of marine observation on stereo networking and collaborative observation of multiple underwater vehicles, the existing underwater collaborative navigation and positioning systems based on "heavy" and "medium" marine equipment are more and more difficult to meet actual application requirements. Requirements on the low-cost long-endurance navigation and positioning are more and more urgent and extensive. Therefore, it urgently needs to provide a deep-sea low-cost long-endurance collaborative navigation and positioning system.

SUMMARY

An objective of the present invention is to provide a deep-sea low-cost long-endurance collaborative navigation and positioning system to solve the above-mentioned problems.

To achieve the above objective, the present invention provides the following solution:

A deep-sea low-cost long-endurance collaborative navigation and positioning system comprises a sequentially connected shore-based monitoring center, a wave glider and an underwater vehicle. The shore-based monitoring center is used for transmitting a route planning solution to the wave glider. The wave glider is used for following the underwater vehicle to travel according to the route planning solution and feeding back state information of the wave glider and state information of the underwater vehicle to the shore-based monitoring center in real time. The shore-based monitoring center is used for adjusting the route planning solution according to the state information of the wave glider and the state information of the underwater vehicle in real time. The wave glider and the underwater vehicle are respectively equipped with an underwater acoustic communication machine to conduct information exchange on the wave glider and the underwater vehicle. The wave glider obtains self location and time information through a satellite and transmits the location and time information to the underwater vehicle in an underwater acoustic communication manner, then the underwater vehicle calculates a horizontal distance between the underwater vehicle and the wave glider to assist a microelectromechanical system (MEMS) sensor of the underwater vehicle in navigation and positioning.

Optionally, the shore-based monitoring center comprises a first satellite communication unit, an information processing unit and a display.

The first satellite communication unit is respectively connected with the information processing unit and the wave glider. The first satellite communication unit is used for forwarding the state information of the wave glider and the state information of the underwater vehicle, transmitted by the wave glider, to the information processing unit. Meanwhile, the first satellite communication unit receives a command of the information processing unit and transmits the command to the wave glider. The information processing unit is used for planning a route of the wave glider and transmitting the route planning solution to the wave glider through the first satellite communication unit. The display is connected with the information processing unit and is used for displaying the state information of the underwater vehicle and the state information and the route planning information of the wave glider.

Optionally, the wave glider comprises a second satellite communication unit, a satellite positioning unit, a first underwater acoustic communication machine, a route planning unit, a surface sound velocity meter and a first atomic clock.

The second satellite communication unit is connected with the first satellite communication unit through the satellite. The second satellite communication unit is connected with the first underwater acoustic communication machine and is used for forwarding the command transmitted by the information processing unit to the first underwater acoustic communication machine through the first satellite communication unit, or forwarding the state information of the underwater vehicle, received by the first underwater acoustic communication machine. The second satellite communication unit is connected with the route planning unit and is used for receiving the route planning solution transmitted by the information processing unit or feeding back an execution situation of the route planning solution of the wave glider to the display.

The satellite positioning unit is connected with the first underwater acoustic communication machine and is used for providing longitude, latitude and time information of the wave glider for the first underwater acoustic communication machine. The satellite positioning unit is connected with the route planning unit and is used for providing the longitude, latitude and time information of the wave glider for the route planning unit. The satellite positioning unit is connected with the first atomic clock and is used for in real time correcting drift of the first atomic clock with the time.

The first underwater acoustic communication machine is connected with the satellite positioning unit and is used for transmitting the longitude, latitude and time information of the wave glider, provided by the satellite positioning unit, to the underwater vehicle at the high update rate. Or the first underwater acoustic communication machine receives underwater acoustic communication information from the underwater vehicle. The first underwater acoustic communication machine is connected with the second satellite communication unit and receives the command from the first satellite communication unit through the second satellite communication unit or transmits the state information of the underwater vehicle to the shore-based monitoring center.

The route planning unit is connected with the second satellite communication unit and receives the route planning solution transmitted by the first satellite communication unit through the second satellite communication unit or feeds back the execution situation of the route planning solution of the wave glider to the shore-based monitoring center.

The surface sound velocity meter is connected with the first underwater acoustic communication machine and is used for providing surface sound velocity information and transmitting the information to the underwater vehicle through the first underwater acoustic communication machine.

The first atomic clock is connected with the first underwater acoustic communication machine and is used for providing a time reference for the first underwater acoustic communication machine.

Optionally, the underwater vehicle comprises a second underwater acoustic communication machine, a MEMS sensor and a combined navigation information fusion unit.

The second underwater acoustic communication machine is in underwater acoustic communication with the first underwater acoustic communication machine and is used for receiving the longitude, latitude and time information of the wave glider, transmitted by the first underwater acoustic communication machine. The second underwater acoustic communication machine is also used for calculating a horizontal distance between the wave glider and the underwater vehicle by measuring a transmission time of the underwater acoustic communication information between the wave glider and the underwater vehicle. Or the second underwater acoustic communication machine transmits the state information of the underwater vehicle to the wave glider. The second underwater acoustic communication machine is connected with the combined navigation information fusion unit and is used for transmitting the calculated horizontal distance information to the combined navigation information fusion unit.

The MEMS sensor is connected with the combined navigation information fusion unit. As a basis of combined navigation, the MEMS sensor provides inertial navigation information including an initial location, velocity, course and the like for the combined navigation information fusion unit. Or the MEMS sensor is used for receiving real combined navigation information generated by the combined navigation information fusion unit to correct error accumulation of the MEMS sensor and initialize the MEMS sensor.

The combined navigation information fusion unit is connected with the second underwater acoustic communication machine and receives the horizontal distance information between the wave glider and the underwater vehicle, provided by the second underwater acoustic communication machine. The combined navigation information fusion unit is connected with the MEMS sensor and receives the initial navigation information provided by the MEMS sensor. The combined navigation information fusion unit fuses the horizontal distance information with the initial navigation information and restricts divergency of the MEMS sensor by the horizontal distance information.

Optionally, the underwater vehicle further comprises a depth meter. The depth meter is connected with the combined navigation information fusion unit and is used for providing depth information for the combined navigation information fusion unit.

Optionally, the underwater vehicle further comprises a sound velocity meter. The sound velocity meter is connected with the second underwater acoustic communication machine and is used for fusing the surface sound velocity information with a historical sound velocity profile data set to generate a new sound velocity profile so as to provide real-time sound velocity profile information for the second underwater acoustic communication machine.

Optionally, the underwater vehicle further comprises a second atomic clock. The second atomic clock is respectively connected with the second underwater acoustic communication machine, the MEMS sensor, the combined navigation information fusion unit, the depth meter and the sound velocity meter. The second atomic clock is used for providing a time reference for the second underwater acoustic communication machine, the MEMS sensor, the combined navigation information fusion unit, the depth meter and the sound velocity meter.

Optionally, the first underwater acoustic communication machine and the second underwater acoustic communication machine are bidirectional underwater acoustic communication machines. The first underwater acoustic communication machine transmits underwater acoustic communication ranging information to the second underwater acoustic communication machine at the high update rate. The second underwater acoustic communication machine transmits the state information of the underwater vehicle to the first underwater acoustic communication machine at the low update rate.

According to specific embodiments provided by the present invention, the present invention discloses the following technical effects:

the present invention provides the deep-sea low-cost long-endurance collaborative navigation and positioning system and achieves an objective of deep-sea low-cost long-endurance collaborative navigation and positioning by collaboratively integrating and deeply fusing all devices to learn from other's strong points to make up one's deficiencies, thereby solving bottleneck problems of the existing navigation and positioning system, such as high costs and short endurance. Compared with the existing underwater collaborative navigation and positioning system based on "heavy" and "medium" marine equipment, the collaborative navigation and positioning system based on "light" marine equipment of the present invention has low costs and long endurance so as to have remarkable advantages.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other accompanying drawings from these accompanying drawings without creative efforts.

DESCRIPTION OF THE EMBODIMENTS

The following clearly and completely describes the technical solutions in the embodiments of the present invention with reference to accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To make the foregoing objective, features, and advantages of the present invention more apparent and more comprehensible, the present invention is further described in detail below with reference to the accompanying drawings and specific embodiments.

The existing underwater navigation and positioning system utilizes a high-precision strapdown inertial navigation system or a dead reckoning system as the core and is assisted by a Doppler log, a pressure-depth meter, a magnetic compass, underwater acoustic positioning, earth field matching positioning and the like to commonly form an inertia-based combined navigation system. However, the high-precision inertial navigation system not only has high price (higher than 800,000 Yuan), but also has high energy consumption (its average energy consumption is about dozens of watts). The earth field matching positioning needs to obtain background field data of an operating area in advance, so its application is largely limited. The underwater acoustic positioning method such as a long baseline, an ultrashort baseline and the like can provide absolute location information for the underwater vehicle, but is also limited by its unique structure, and it also has high price (higher than 2 million Yuan). The existing navigation and positioning system not only has high use cost, but also is difficult to meet the requirement on long endurance so as to directly influence the operating efficiency of the underwater vehicle during deep-sea scientific research, environmental survey and resource development.

With the low cost, long endurance and clustering development of a deep-sea underwater vehicle and the strong demands of marine observation on stereo networking and collaborative observation of multiple underwater vehicles, the existing underwater collaborative navigation and positioning systems based on "heavy" and "medium" marine equipment are more and more difficult to meet actual application requirements. Requirements on the low-cost long-endurance navigation and positioning are more and more urgent and extensive. Therefore, it urgently needs to provide a deep-sea low-cost long-endurance collaborative navigation and positioning system.

However, in recent years, the "light" marine equipment including the wave glider, the underwater acoustic communication machine, the MEMS sensor and the like are greatly developed. Because the wave glider is a low-cost autonomous operation platform which is not limited by the energy resource, can operate in a wide range for a long time and does not need to be maintained, it has been widely applied to the marine observation. With the development of the underwater acoustic communication technology, when information related to an emitter is transmitted, transmission time delay of an underwater acoustic signal can be accurately measured and is used for assisting navigation and positioning. With the development of the microelectronic technology and the silicon processing technology, the MEMS sensor represents a mechanical sensor to reappear on the stage of the inertial navigation system.

In view of this, the present invention provides a collaborative navigation and positioning system based on "light" marine equipment, including a wave glider, underwater acoustic communication machines, a MEMS sensor and the like, and achieves an objective of deep-sea low-cost long-endurance collaborative navigation and positioning by collaboratively integrating and deeply fusing all devices to learn from other's strong points to make up one's deficiencies, thereby solving bottleneck problems of the existing navigation and positioning system, such as high costs and short endurance.

Figure 1:
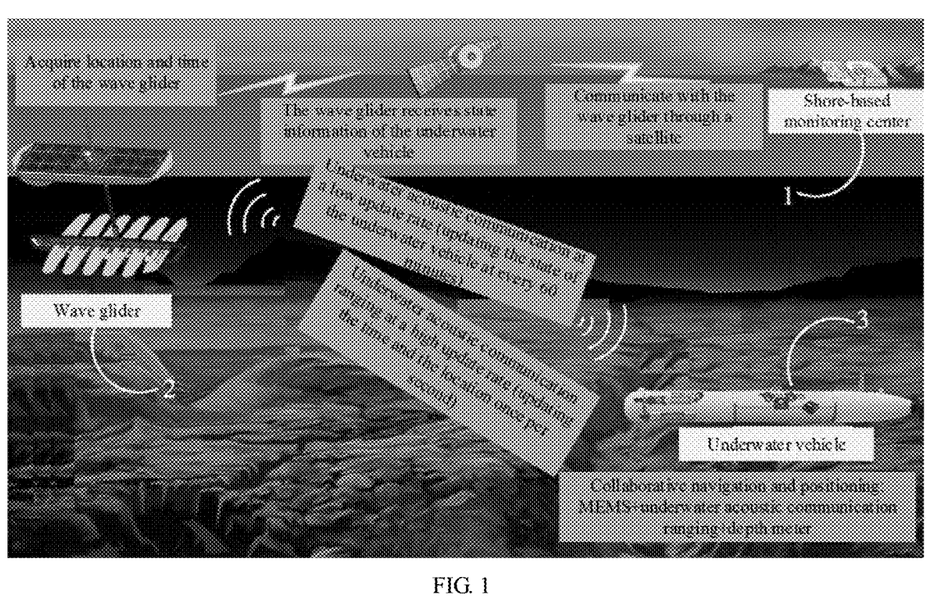
FIG. 1 is a structural diagram of a deep-sea low-cost long-endurance collaborative navigation and positioning system of the present invention.

FIG. 1 is a structural diagram of a deep-sea low-cost long-endurance collaborative navigation and positioning system of the present invention. As shown in FIG. 1, a deep-sea low-cost long-endurance collaborative navigation and positioning system comprises a sequentially connected shore-based monitoring center 1, a wave glider 2 and an underwater vehicle 3. The shore-based monitoring center 1 is used for transmitting a route planning solution to the wave glider 2. The wave glider 2 is used for following the underwater vehicle 3 to travel according to the route planning solution and feeding back state information of the wave glider 2 and state information of the underwater vehicle 3 to the shore-based monitoring center 1 in real time. The shore-based monitoring center 1 is used for adjusting the route planning solution according to the state information of the wave glider 2 and the state information of the underwater vehicle 3 in real time. The wave glider 2 and the underwater vehicle 3 are respectively equipped with an underwater acoustic communication machine to conduct information exchange on the wave glider and the underwater vehicle. The wave glider 2 obtains self location and time information through a satellite and transmits the location and time information to the underwater vehicle 3 in an underwater acoustic communication manner (at a high update rate of updating once per second), then the underwater vehicle 3 can calculate a horizontal distance between the underwater vehicle 3 and the wave glider 2 to assist a microelectromechanical system (MEMS) sensor of the underwater vehicle 3 in navigation and positioning.

Figure 2:
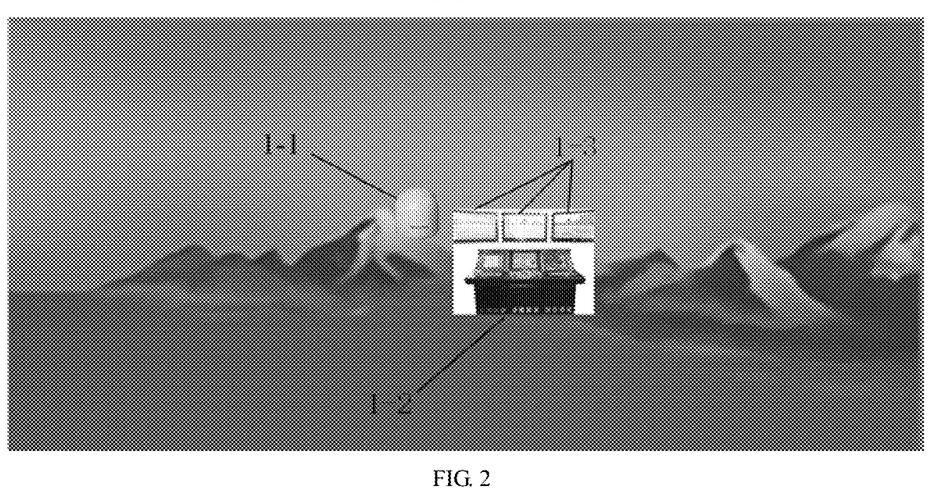
FIG. 2 is a schematic diagram of a shore-based monitoring center in the present invention.
Figure 3:
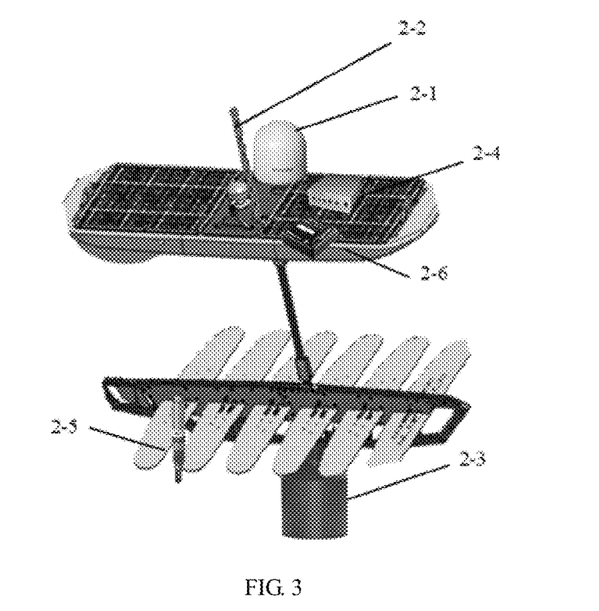
FIG. 3 is a schematic diagram of a wave glider in the present invention.
Figure 4:
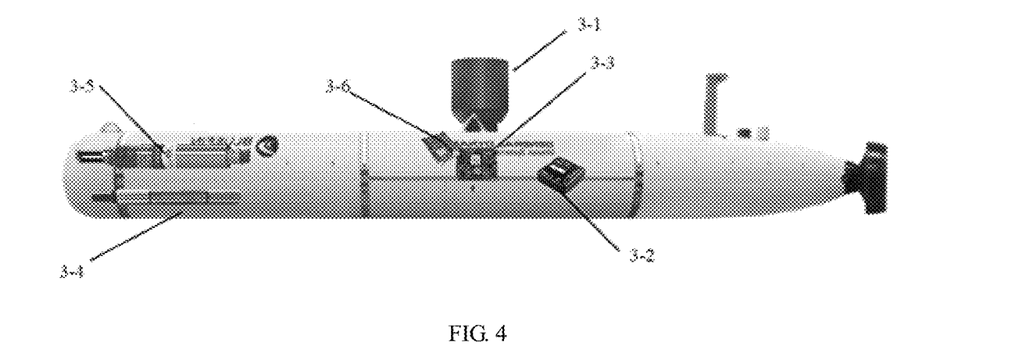
FIG. 4 is a schematic diagram of an underwater vehicle in the present invention.

FIG. 2 is a schematic diagram of a shore-based monitoring center in the present invention. FIG. 3 is a schematic diagram of a wave glider in the present invention. FIG. 4 is a schematic diagram of an underwater vehicle in the present invention. As shown in FIG. 2, FIG. 3 and FIG. 4, the shore-based monitoring center 1 comprises a first satellite communication unit 1-1, an information processing unit 1-2 and a display 1-3. The wave glider 2 comprises a second satellite communication unit 2-1, a satellite positioning unit 2-2, a first underwater acoustic communication machine 2-3, a route planning unit 2-4, a surface sound velocity meter 2-5 and a first atomic clock 2-6. The underwater vehicle 3 comprises a second underwater acoustic communication machine 3-1, a MEMS sensor 3-2, a combined navigation information fusion unit 3-3, a depth meter 3-4, a sound velocity meter 3-5 and a second atomic clock 3-6.

The shore-based monitoring center 1 is mainly used for:
(1) transmitting the route planning solution of the shore-based monitoring center 1 to the wave glider 2;
(2) transmitting a command of the shore-based monitoring center 1 to the wave glider 2, wherein the wave glider 2 transmits the command to the underwater vehicle 3;
(3) receiving route evaluation data transmitted by the wave glider 2, wherein the route evaluation data is used for updating the route planning solution of the shore-based monitoring center 1;
(4) receiving the state information, including location, energy consumption, attitude, alarm information and the like, of the underwater vehicle transmitted by the wave glider 2. The information processing unit 1-2 and the display 1-3 are mainly used for planning a route of the wave glider 2 and intuitively displaying locations, energy consumption, attitudes, alarm information and the like of the wave glider 2 and the underwater vehicle 3.

The wave glider 2 is utilized as an information junction of the underwater vehicle 3 and the shore-based monitoring center 1. The wave glider 2 is mainly used for:
(1) acquiring longitude, latitude and time information of the wave glider through the satellite positioning unit;
(2) transmitting underwater acoustic communication ranging information to the underwater vehicle 3 through the underwater acoustic communication machine at a high update rate (such as updating once per second) and receiving underwater acoustic communication information from the underwater vehicle 3 at a low update rate (such as updating once at every 60 minutes);
(3) exchanging information with the shore-based monitoring center 1 in a satellite communication manner;
(4) traveling according to a reasonable route based on the route planning solution to ensure continuous and reliable underwater acoustic communication information exchange between the wave glider 2 and the underwater vehicle 3.

The underwater vehicle 3 is mainly used for:
(1) receiving the underwater acoustic communication ranging information transmitted by the wave glider 2 through the underwater acoustic communication machine;
(2) measuring a transmission time of the underwater acoustic communication ranging information and then calculating a horizontal distance between the wave glider 2 and the underwater vehicle 3;
(3) transmitting the state information of the underwater vehicle 3 to the wave glider 2 at a low update rate (such as updating once at every 60 minutes).
(4) fusing the calculated horizontal distance information and an initial navigation information of the MEMS sensor, and restricting divergency of the MEMS sensor by the horizontal distance information.

A navigation and positioning system of the underwater vehicle is used for navigating and positioning the underwater vehicle 3 mainly as well as the wave glider 2 and the shore-based monitoring center 1 secondly.

The first satellite communication unit 1-1 is connected with the information processing unit 1-2 of the shore-based monitoring center 1 to forward information of the underwater vehicle 3, transmitted by the wave glider 2, to the information processing unit 1-2, and also to receive a command of the information processing unit 1-2 and transmit the command to the wave glider 2. The information processing unit 1-2 is connected with the satellite communication unit 1-1 of the shore-based monitoring center 1. The information processing unit 1-2 is used for processing the state information of the wave glider 2 and the state information of the underwater vehicle 3, transmitted by the wave glider 2, and transmitting a manually inputted command to the wave glider 2 through the first satellite communication unit 1-1. The information processing unit 1-2 is mainly used for planning a route of the wave glider 2 and transmitting the route planning solution to the wave glider 2 through the first satellite communication unit 1-1. The display 1-3 is connected with the information processing unit of the shore-based monitoring center 1 and is used for displaying the state information of the underwater vehicle and the state information of the wave glider as well as the route planning information.

The second satellite communication unit 2-1 is connected with the first satellite communication unit 1-1 through the satellite to conduct interactive communication. The second satellite communication unit 2-2 is connected with the first underwater acoustic communication machine 2-3 to transmit a command from the shore-based monitoring center 1 to the first underwater acoustic communication machine 2-3, or to forward the state information of the underwater vehicle 3, received by the first underwater acoustic communication machine 2-3. the second satellite communication unit 2-2 is connected with the route planning unit 2-4 to receive the route planning solution, transmitted by the shore-based monitoring center 1, or to feed back an execution situation of the route planning solution of the wave glider 2 to the shore-based monitoring center 1.

The satellite positioning unit 2-2 is connected with the first underwater acoustic communication machine 2-3 to provide the longitude, latitude and time information of the wave glider 2 for the first underwater acoustic communication machine. The satellite positioning unit 2-2 is connected with the route planning unit 2-4 to provide the longitude, latitude and time information of the wave glider 2 for the route planning unit. The satellite positioning unit 2-2 is connected with the first atomic clock 2-6 to in real time correct drift of the first atomic clock with the time.

The first underwater acoustic communication machine 2-3 is connected with the satellite positioning unit 2-2 to transmit the longitude, latitude and time information of the wave glider 2, provided by the satellite positioning unit 2-2, to the underwater vehicle 3 at the high update rate (such as updating once per second). Or the first underwater acoustic communication machine receives the underwater acoustic communication information from the underwater vehicle 3.

The first underwater acoustic communication machine 2-3 is connected with the second satellite communication unit 2-1 to receive the command from the first satellite communication unit 1-1 through the second satellite communication unit or to transmit the state information of the underwater vehicle 3 to the shore-based monitoring center 1.

The route planning unit 2-4 is connected with the second satellite communication unit 2-1. The route planning unit 2-4 receives the route planning solution from the shore-based monitoring center 1 or feeds back the execution situation of the route planning solution of the wave glider 2 to the shore-based monitoring center 1.

The surface sound velocity meter 2-5 is connected with the first underwater acoustic communication machine 2-3. The surface sound velocity meter 2-5 is used for providing surface sound velocity profile information and transmitting the information to the underwater vehicle 3 through the first underwater acoustic communication machine 2-3.

The first atomic clock 2-6 is connected with the first underwater acoustic communication machine 2-3 and is used for providing a time reference. The first atomic clock 2-6 is connected with the satellite positioning unit 2-2 and is used for in real time correcting the drift of the first atomic clock 2-6 with the time.

The second underwater acoustic communication machine 3-1 is in underwater acoustic communication with the first underwater acoustic communication machine 2-3 and is used for receiving the longitude, latitude and time information of the wave glider 2, transmitted by the first underwater acoustic communication machine. The second underwater acoustic communication machine is also used for calculating a horizontal distance between the wave glider and the underwater vehicle by measuring a transmission time of the underwater acoustic communication information between the wave glider 2 and the underwater vehicle 3. Or the second underwater acoustic communication machine transmits the state information of the underwater vehicle 3 to the wave glider 2. The second underwater acoustic communication machine 3-1 is connected with the combined navigation information fusion unit 3-3 and is used for transmitting the calculated horizontal distance information to the combined navigation information fusion unit 3-3.

The MEMS sensor 3-2 is connected with the combined navigation information fusion unit 3-3. As a basis of combined navigation, the MEMS sensor 3-2 provides inertial navigation information including an initial location, velocity, course and the like for the combined navigation information fusion unit. Or the MEMS sensor is used for receiving real combined navigation information generated by the combined navigation information fusion unit to correct error accumulation of the MEMS sensor 3-2 and initialize the MEMS sensor 3-2.

The combined navigation information fusion unit 3-3 is connected with the second underwater acoustic communication machine 3-1 and receives the horizontal distance information between the wave glider 2 and the underwater vehicle 3, provided by the second underwater acoustic communication machine. The combined navigation information fusion unit 3-3 is connected with the MEMS sensor 3-2 and receives the initial navigation information provided by the MEMS sensor. The combined navigation information fusion unit 3-3 fuses the horizontal distance information with the initial navigation information and restricts divergency of the MEMS sensor 3-2 by the horizontal distance information.

The depth meter 3-4 is connected with the combined navigation information fusion unit 3-3 to provide depth information for the combined navigation information fusion unit 3-3. The sound velocity meter 3-5 is connected with the second underwater acoustic communication machine 3-1 to fuse the surface sound velocity profile information with a historical sound velocity profile data set to generate a new sound velocity profile so as to provide real-time sound velocity profile information for the second underwater acoustic communication machine.

The second atomic clock 3-6 is respectively connected with the second underwater acoustic communication machine 3-1, the MEMS sensor 3-2, the combined navigation information fusion unit 3-3, the depth meter 3-4 and the sound velocity meter 3-5. The second atomic clock 3-6 is used for providing a time reference for the second underwater acoustic communication machine 3-1, the MEMS sensor 3-2, the combined navigation information fusion unit 3-3, the depth meter 3-4 and the sound velocity meter 3-5.

The first underwater acoustic communication machine 2-3 and the second underwater acoustic communication machine 3-1 are bidirectional underwater acoustic communication machines. The first underwater acoustic communication machine 2-3 transmits the underwater acoustic communication ranging information to the second underwater acoustic communication machine 3-1 at the high update rate (such as updating once per second). The second underwater acoustic communication machine 3-1 transmits the state information of the underwater vehicle 3 to the first underwater acoustic communication machine 2-3 at the low update rate (such as updating once at every 60 minutes).

The present invention provides the collaborative navigation and positioning system based on "light" marine equipment, including the wave glider, the underwater acoustic communication machines, the MEMS sensor and the like, and achieves an objective of deep-sea low-cost long-endurance collaborative navigation and positioning by collaboratively integrating and deeply fusing all devices to learn from other's strong points to make up one's deficiencies, thereby solving bottleneck problems of the existing navigation and positioning system, such as high costs and short endurance. Compared with the existing underwater collaborative navigation and positioning system based on "heavy" and "medium" marine equipment, the collaborative navigation and positioning system based on "light" marine equipment of the present invention has low costs and long endurance so as to have remarkable advantages.

Each embodiment of the present specification is described in a progressive manner, each embodiment focuses on the difference from other embodiments, and the same and similar parts between the embodiments may refer to each other. For a system disclosed in the embodiments, since it corresponds to the method disclosed in the embodiments, the description is relatively simple, and reference can be made to the method description.

Several examples are used for illustration of the principles and implementation methods of the present invention. The description of the embodiments is used to help illustrate the method and its core principles of the present invention. In addition, a person of ordinary skill in the art can make various modifications in terms of specific embodiments and scope of application in accordance with the teachings of the present invention. In conclusion, the content of this specification shall not be construed as a limitation to the present invention.

What is claimed is:

1. A deep-sea collaborative navigation and positioning system, comprising a sequentially connected shore-based monitoring center, a wave glider and an underwater vehicle, wherein the shore-based monitoring center is used for transmitting a route planning solution to the wave glider; the wave glider is used for following the underwater vehicle to travel according to the route planning solution and feeding back state information of the wave glider and state information of the underwater vehicle to the shore-based monitoring center in real time; the shore-based monitoring center is used for adjusting the route planning solution according to the state information of the wave glider and the state information of the underwater vehicle in real time; the wave glider and the underwater vehicle are respectively equipped with an underwater acoustic communication machine to conduct information exchange on the wave glider and the underwater vehicle; the wave glider obtains self location and time information through a satellite and transmits the location and time information to the underwater vehicle in an underwater acoustic communication manner, then the underwater vehicle can calculate a horizontal distance between the underwater vehicle and the wave glider to assist a microelectromechanical system (MEMS) sensor of the underwater vehicle in navigation and positioning.

2. The deep-sea collaborative navigation and positioning system according to claim 1, wherein the shore-based monitoring center comprises a first satellite communication unit, an information processing unit and a display;
the first satellite communication unit is respectively connected with the information processing unit and the wave glider; the first satellite communication unit is used for forwarding the state information of the wave glider and the state information of the underwater vehicle, transmitted by the wave glider, to the information processing unit, meanwhile, the first satellite communication unit receives a command of the information processing unit and transmits the command to the wave glider; the information processing unit is used for planning a route of the wave glider and transmitting the route planning solution to the wave glider through the first satellite communication unit; the display is connected with the information processing unit and is used for displaying the state information of the underwater vehicle and the state information and the route planning information of the wave glider.

3. The deep-sea collaborative navigation and positioning system according to claim 2, wherein the wave glider comprises a second satellite communication unit, a satellite positioning unit, a first underwater acoustic communication machine, a route planning unit, a surface sound velocity meter and a first atomic clock;
the second satellite communication unit is connected with the first satellite communication unit through the satellite; the second satellite communication unit is connected with the first underwater acoustic communication machine and is used for forwarding the command transmitted by the information processing unit to the first underwater acoustic communication machine through the first satellite communication unit, or forwarding the state information of the underwater vehicle, received by the first underwater acoustic communication machine; the second satellite communication unit is connected with the route planning unit and is used for receiving the route planning solution transmitted by the information processing unit or feeding back an execution situation of the route planning solution of the wave glider to the display;
the satellite positioning unit is connected with the first underwater acoustic communication machine and is used for providing longitude, latitude and time information of the wave glider for the first underwater acoustic communication machine; the satellite positioning unit is connected with the route planning unit and is used for providing the longitude, latitude and time information of the wave glider for the route planning unit; the satellite positioning unit is connected with the first atomic clock and is used for in real time correcting drift of the first atomic clock with the time;
the first underwater acoustic communication machine is connected with the satellite positioning unit and is used for transmitting the longitude, latitude and time information of the wave glider, provided by the satellite positioning unit, to the underwater vehicle at a first update rate; or the first underwater acoustic communication machine receives underwater acoustic communication information from the underwater vehicle; the first underwater acoustic communication machine is connected with the second satellite communication unit and receives the command from the first satellite communication unit through the second satellite communication unit or transmits the state information of the underwater vehicle to the shore-based monitoring center;
the route planning unit is connected with the second satellite communication unit and receives the route planning solution transmitted by the first satellite communication unit through the second satellite communication unit or feeds back the execution situation of the route planning solution of the wave glider to the shore-based monitoring center;
the surface sound velocity meter is connected with the first underwater acoustic communication machine and is used for providing surface sound velocity information and transmitting the information to the underwater vehicle through the first underwater acoustic communication machine;

the first atomic clock is connected with the first underwater acoustic communication machine and is used for providing a time reference for the first underwater acoustic communication machine.

4. The deep-sea collaborative navigation and positioning system according to claim 3, wherein the underwater vehicle comprises a second underwater acoustic communication machine, a MEMS sensor and a combined navigation information fusion unit; the second underwater acoustic communication machine is in underwater acoustic communication with the first underwater acoustic communication machine and is used for receiving the longitude, latitude and time information of the wave glider, transmitted by the first underwater acoustic communication machine; the second underwater acoustic communication machine is also used for calculating a horizontal distance between the wave glider and the underwater vehicle by measuring a transmission time of the underwater acoustic communication information between the wave glider and the underwater vehicle; or the second underwater acoustic communication machine transmits the state information of the underwater vehicle to the wave glider; the second underwater acoustic communication machine is connected with the combined navigation information fusion unit and is used for transmitting the calculated horizontal distance information to the combined navigation information fusion unit;

the MEMS sensor is connected with the combined navigation information fusion unit; as a basis of combined navigation, the MEMS sensor provides inertial navigation information including an initial location, velocity and course for the combined navigation information fusion unit; or the MEMS sensor is used for receiving real combined navigation information generated by the combined navigation information fusion unit to correct error accumulation of the MEMS sensor and initialize the MEMS sensor;

the combined navigation information fusion unit is connected with the second underwater acoustic communication machine and receives the horizontal distance information between the wave glider and the underwater vehicle, provided by the second underwater acoustic communication machine; the combined navigation information fusion unit is connected with the MEMS sensor and receives the initial navigation information provided by the MEMS sensor; the combined navigation information fusion unit fuses the horizontal distance information with the initial navigation information and restricts divergency of the MEMS sensor by the horizontal distance information.

5. The deep-sea collaborative navigation and positioning system according to claim 4, wherein the underwater vehicle further comprises a depth meter; the depth meter is connected with the combined navigation information fusion unit and is used for providing depth information for the combined navigation information fusion unit.

6. The deep-sea collaborative navigation and positioning system according to claim 5, wherein the underwater vehicle further comprises a sound velocity meter; the sound velocity meter is connected with the second underwater acoustic communication machine and is used for fusing the surface sound velocity information with a historical sound velocity profile data set to generate a new sound velocity profile so as to provide real-time sound velocity profile information for the second underwater acoustic communication machine.

7. The deep-sea collaborative navigation and positioning system according to claim 6, wherein the underwater vehicle further comprises a second atomic clock; the second atomic clock is respectively connected with the second underwater acoustic communication machine, the MEMS sensor, the combined navigation information fusion unit, the depth meter and the sound velocity meter; the second atomic clock is used for providing a time reference for the second underwater acoustic communication machine, the MEMS sensor, the combined navigation information fusion unit, the depth meter and the sound velocity meter.

8. The deep-sea collaborative navigation and positioning system according to claim 4, wherein the first underwater acoustic communication machine and the second underwater acoustic communication machine are bidirectional underwater acoustic communication machines; the first underwater acoustic communication machine transmits underwater acoustic communication ranging information to the second underwater acoustic communication machine at the first update rate; the second underwater acoustic communication machine transmits the state information of the underwater vehicle to the first underwater acoustic communication machine at a second update rate, wherein the second update rate is less than the first update rate.

\* \* \* \* \*